G. T. FOSTER.
FEED WATER HEATER.
APPLICATION FILED JUNE 18, 1917.

1,331,845. Patented Feb. 24, 1920.
3 SHEETS—SHEET 1.

WITNESSES
INVENTOR

G. T. FOSTER.
FEED WATER HEATER.
APPLICATION FILED JUNE 18, 1917.

1,331,845.

Patented Feb. 24, 1920.
3 SHEETS—SHEET 2.

WITNESSES

INVENTOR

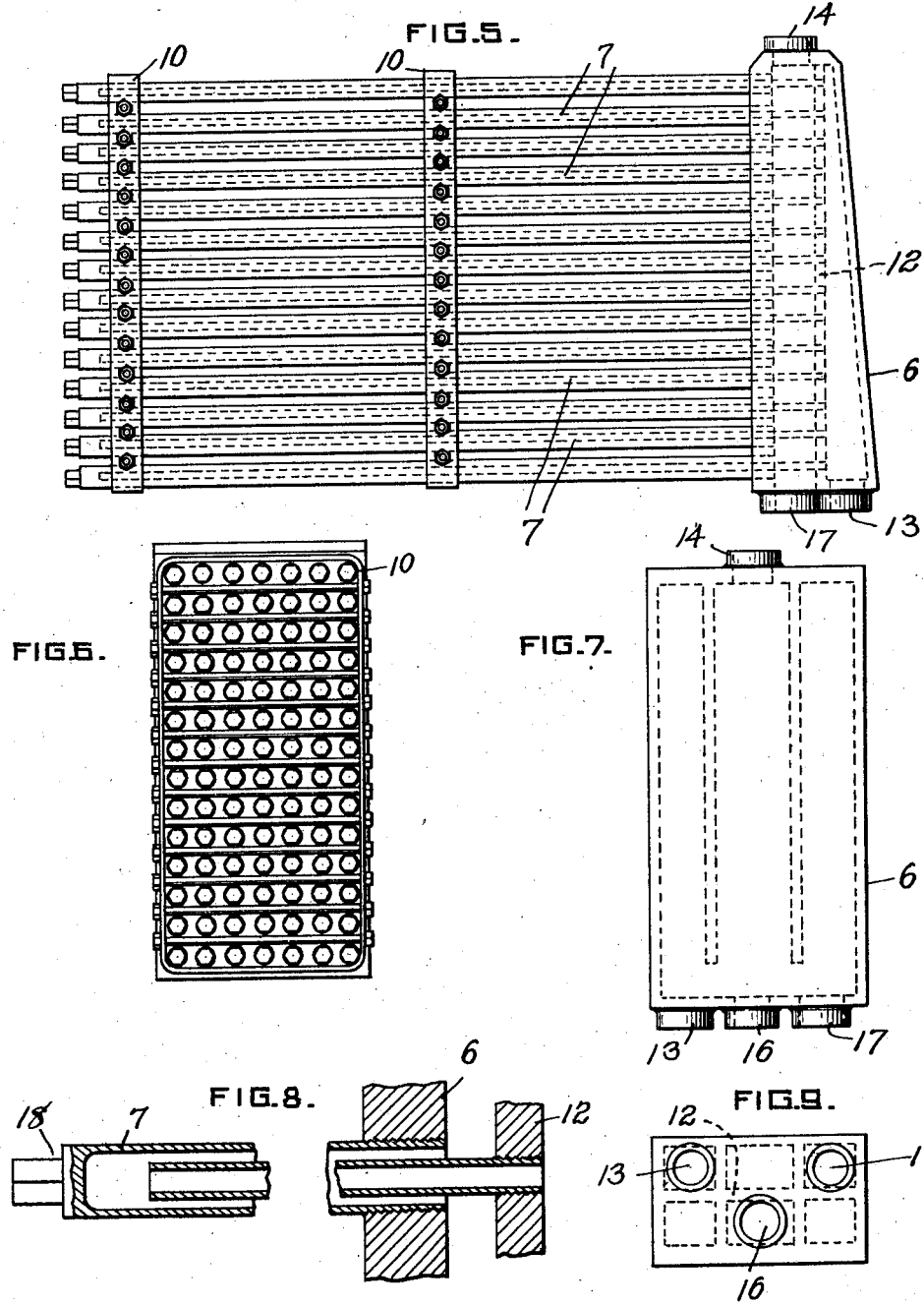

UNITED STATES PATENT OFFICE.

GUY T. FOSTER, OF SHAWNEE, OKLAHOMA, ASSIGNOR TO LE ROY THOMPSON, OF TULSA, OKLAHOMA.

FEED-WATER HEATER.

1,331,845.  Specification of Letters Patent.  Patented Feb. 24, 1920.

Application filed June 18, 1917. Serial No. 175,394.

*To all whom it may concern:*

Be it known that I, GUY T. FOSTER, residing at Shawnee, in the county of Pottawatomie and State of Oklahoma, a citizen of the United States, have invented or discovered certain new and useful Improvements in Feed - Water Heaters, of which improvements the following is a specification.

My invention relates to feed water heaters, and, while not limited in its applicability to any particular kind of associated apparatus, is nevertheless useful in connection with the steam boilers of locomotive engines. It has been developed in this connection, and is here shown and described in this connection.

Figure 1:
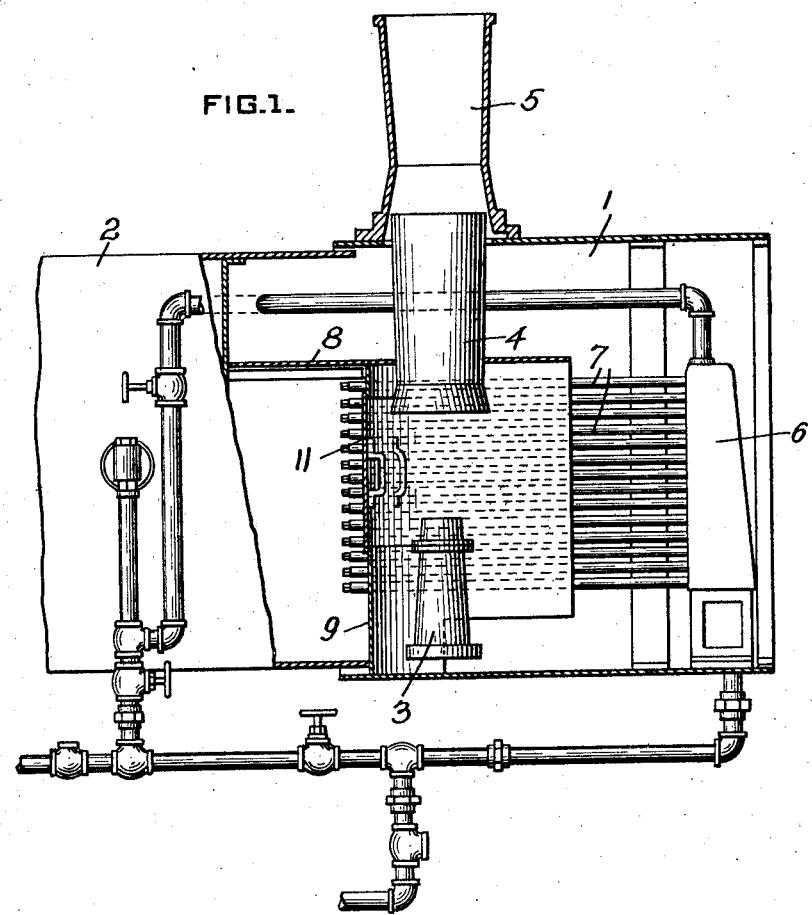
Figure 2:
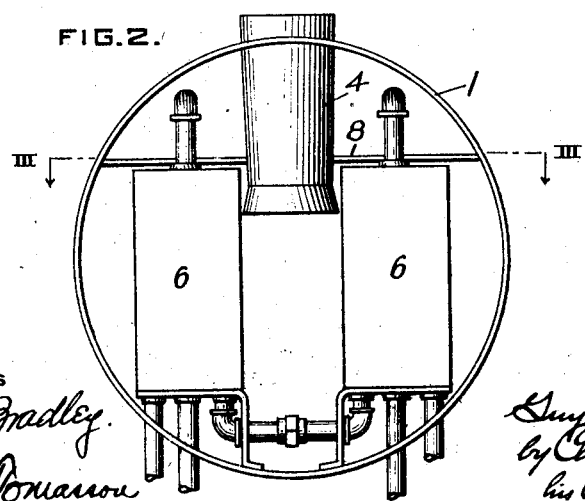
Figure 3:
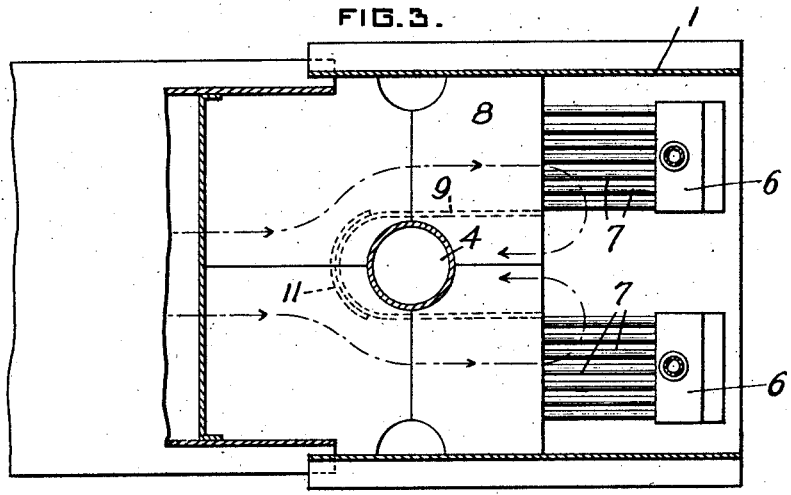
Figure 4:
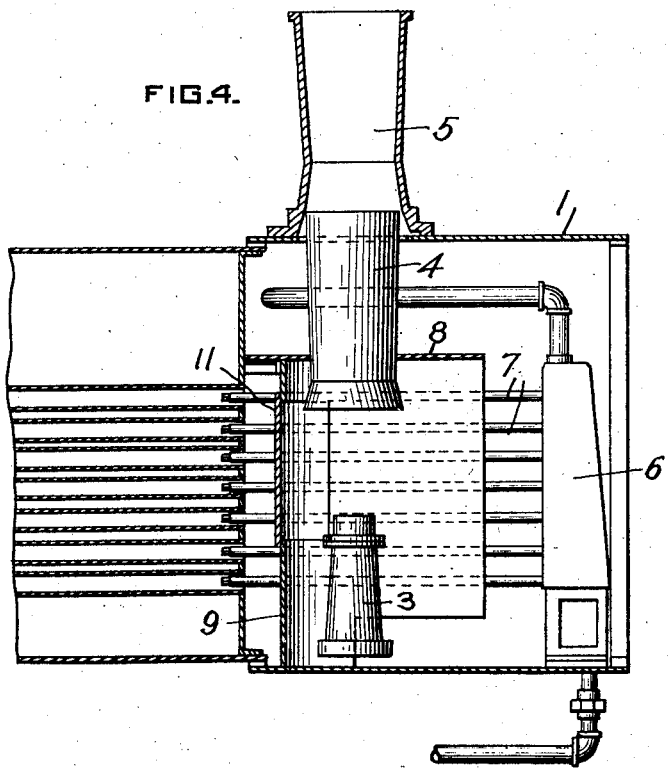

In the accompanying drawings Figure 1 shows, partly in side elevation, partly in vertical medial and longitudinal section, the forward end of a locomotive, equipped with the feed water heater of my invention, the forward end or head of the smoke-box being removed; Fig. 2 is a view in end elevation of the same structure; Fig. 3 is a view in horizontal section, the plane of section being indicated by the line III—III, Fig. 2. Fig. 4 is a view in vertical section, similar to Fig. 1, but illustrating a locomotive equipped with my invention, possessing certain modifications in arrangement. Figs. 5–9, inclusive, illustrate in detail the construction of the heater itself; Fig. 5 is a view of the heater in side elevation; Fig. 6 is a view of one half of the heater in end elevation, seen from the left-hand end, Fig. 5; Fig. 7 is a view in end elevation seen from the opposite end. Fig. 8 is a view in vertical section and on larger scale of one of the double circulation tubes of the heater, applied to the header. Fig. 9 is a plan view of the header seen from below, and drawn to the same scale as Fig. 7.

My present invention concerns two particular features of the structure of the water heater: one of them the general arrangement, which brings about the exposure of large surfaces of the water conduit to the streams of hot gas; the other the detail construction, in which the arrangement of the water conduits interferes in least degree with the free circulation of the hot gases. Both features contribute to the common end—heat exchange.

Taking first the feature first indicated, and referring particularly to Figs. 1–3 of the drawings, it will be seen that the heater is arranged, as is common, in the smoke-box 1 of the locomotive 2; it extends from the anterior end of the smoke-box rearward toward the boiler proper; it is a two-part structure, arranged half on either side of the middle line, and in its rearward extent it lies on either side of the draft from the steam exhaust 3 to the pipe 4 leading to the smoke stack 5. And it will be observed (Fig. 1) that the heater extends vertically from a level lower than the steam exhaust to a level higher than the lower end of pipe 4.

The heater consists, in its two part construction, of headers 6, arranged at the anterior end of the smoke-box and circulation pipes 7 (a bank of pipes to each header) communicating with the headers, extending rearwardly from the headers, and accessible to the penetration of hot gases between and around the pipes.

Leaving for detailed explanation hereafter the particular construction of the circulation pipes and the manner of supporting them, I now direct attention to the baffle-plates or screens which serve to limit and define the passageways for the hot gases.

The baffle-plates 8 and 9 limit and define the passageways for the hot gases, as they pass from the boiler tubes on their way to the smoke-stack. The baffle-plate 8 (*cf.* Figs. 1, 2, and 3) extends horizontally forward from the boiler proper at a level just above the bank of boiler-tubes and just above the banks of heater tubes, to a point well beyond the smoke-stack; the baffle-plate 9 is vertically disposed, it is U-shaped or V-shaped, and, arranged with the bend of the V directed rearwardly, the arms forwardly; it fences off the smoke-stack from direct access of the heated gases, causes them to subdivide and flow in two streams, forwardly through the two banks of heater pipes, and then to turn inward and rearward to reach the smoke-stack in a reunited stream, within the V. This is indicated by the arrows *a*, Fig. 3.

It has been noted and will be particularly observed in this connection that the circulation pipes 7 of the heater extend from the headers 6 rearwardly, so that the spaces between are freely open to the heated gases advancing longitudinally between them. The circulation pipes are secured to the headers at their forward ends; their rear ends "float" on suitable supports 10 (cf. Figs. 5 and 6). These supports are made to offer the least obstruction to the access of the hot gases to the spaces between the circulation pipes; and manifestly the construction allows the free thermal expansion and contraction of the circulation pipes.

It will further be observed of this arrangement of the circulation pipes of the feed-water heater within the passageway for the products of combustion, that it is an arrangement least obstructive to free flow of the smoke and gases. The pipes extend longitudinally in the stream; the conduit through which the smoke and gases advance, though in form irregular, because of the presence of these circulation pipes, is at successive points in the advancing stream substantially uniform; there is a minimum of disturbing eddies in the flow of smoke and gases. The arrangement is such as might be expected to interfere least with the draft from the fire box. In point of fact, instead of being an interference, the presence of my feed-water heater arranged in the smoke-box as I show and describe it, is actually advantageous in that it improves draft conditions; less power is required to maintain the forced draft from fire-box through smoke-stack; the steam-exhaust nozzle 3 may have a correspondingly larger orifice; there is less back pressure on the steam valves; the efficiency of the engine is increased accordingly.

This arrangement of the circulation pipes, in that they extend longitudinally of the boiler and in the line of travel of the locomotive, is further advantageous, for this reason: The shocks and strains of service are most effectively resisted, and such racking of structure as tends to cause leakage is practically eliminated.

To afford ready access to the heater in all its parts the baffle plate 9 may be provided with a man-hole covered with a removable door 11. The arrangement of duplicate headers at the forward end and on either side of the smoke-box, with rearwardly extending circulation tubes, permits of sufficient separation to allow passage between; passage may also be had beneath each bank of circulation tubes. Thus the whole feed-water heater and the boiler flues are freely accessible through the front end of the smoke-box, a condition which does not obtain in the case of any other projected smoke-box feed-water heater known to me.

Coming now to the particular construction of the heater, it will be observed, on comparing Figs. 5, 7, and 9, that each header is divided internally by a partition wall 12 into anterior and posterior compartments.

The water inlet 13 is to the anterior compartment, and there is no communication from anterior compartment to posterior, except through the circulation tubes presently to be described. The outlet 14 leads from the posterior compartment. The inlet is at the bottom and the outlet at the top. A blow-off connects with an opening 16 in the posterior chamber at the bottom. The anterior chambers of the two headers are interconnected through openings 17 at the bottom, to the end that water injection or supply from one side only may (in case of accident, for instance) reach both parts of the double heater. The pipe connections are indicated in Figs. 1 and 2: Water from the injector or other supply enters the headers through inlets 13, and water passing out at openings 14 is carried to the boiler. Water passages from feed-water heater to boiler being duplicate, the water may be introduced at two points and thus variations of temperature may be better distributed and undesirable incidental effects diminished.

The circulation tubes are illustrated in Figs. 5 and 8. They are double, concentrically arranged tubes; the inner or inflow tubes are set in openings in partition 12 in the headers and are open at their free ends, the outer or out-flow tubes are set in the rear walls of the headers and are closed at their free ends. The particular arrangement is known, and will be clearly understood on examining the drawings in the light of this description. Such circulation tubes are commonly known as Field tubes.

It will be observed that these tubes, extending rearwardly into the stream of gases in the manner already explained, are in position in size and in shape calculated to give the greatest heating effect with least disturbance to the flowing stream; the tubes are cylindrical, and lie in the line of flow; at the points where the stream of products of combustion, impinging upon them, is in its continuity broken, the tendency to formation of eddies in the stream is reduced to a minimum, and the passageway is choked in least possible degree.

It will be understood that the stream of products of combustion, carrying as it does cinders (particularly if it be a coal-burning engine) and sand (often introduced in the fire-box to keep the passages free of soot) and other solid particles, is abrasive, and tends to cut and wear away any preheater arranged in its course; and it will be observed of my preheater, with its circulation pipes 7 extending in the line of flow of the stream, that the posterior ends 18 of the pipes may be reinforced in thickness to endure abrasion, while the pipe walls, not being exposed to direct impact, may be made thin.

It will, however, be observed (and this is a feature of novelty) that the tubes are screw-threaded into their supporting walls (cf. Fig. 8), instead of being expanded into openings in the walls, as is usual. It follows from this that the headers may be single castings, and the bolting together of parts with interposed gaskets is no longer a feature of the construction. Here an objectionable feature and a feature of difficulty is dispensed with.

The heater tubes will conveniently be brought into alinement with the boiler tubes, to the end that the heater tubes may be applied and removed through the boiler tubes. This is a known arrangement.

Fig. 1 indicates the heater arranged at an interval in advance of the forward end of the boiler tubes. The modification illustrated in Fig. 4 consists in the elimination of this space, and shows the posterior ends of the heater tubes actually extending into the anterior ends of the alined boiler tubes. The arrangement particularly shown in Fig. 4 requires no elongation of the smoke-box beyond what is otherwise desirable and common; the arrangement of Fig. 1 involves an elongation of the smoke-box.

I claim as my invention:

1. In a locomotive construction the combination with a smoke-box in which is formed a passageway for the flow of the products of combustion in circuitous stream, of a feed-water heater comprising a header arranged adjacent a bend in such passageway and circulation pipes of Field type extending from the header and into said passageway in the line of, and in direction opposite to, the normal flow of products of combustion therethrough, substantially as described.

2. In a locomotive construction the combination with a smoke-box through which products of combustion pass under forced draft from the fire box and boiler, of a feed-water heater consisting of a header and of circulation pipes of Field type extending therefrom, said circulation pipes extending into the stream of the products of combustion in the line of and in opposite direction to the flow and being reinforced at their ends, substantially as described.

3. In a locomotive construction the combination of a boiler with longitudinal flues, a smoke-box arranged at the forward end of the boiler, a smoke-stack leading from the smoke-box, a passageway for products of combustion, formed within the smoke-box and leading forward and then turning laterally on the way to the smoke-stack, a feed-water heater comprising a header arranged at the forward end of the smoke-box, opposite the ends of the boiler flues, and beyond the turn in the passageway for products of combustion, and circulation tubes of Field type, screw-threaded into said header, and extending from the header rearward into the passageway for products of combustion, each tube being alined with a boiler flue, substantially as described.

In testimony whereof I have hereunto set my hand.

GUY T. FOSTER.

Witnesses:
L. R. THOMPSON,
M. L. BONSON.